United States Patent [19]
Hornbeck

[11] Patent Number: 5,535,047
[45] Date of Patent: Jul. 9, 1996

[54] ACTIVE YOKE HIDDEN HINGE DIGITAL MICROMIRROR DEVICE

[75] Inventor: Larry J. Hornbeck, Van Alstyne, Tex.

[73] Assignee: Texas Instruments Incorporated, Dallas, Tex.

[21] Appl. No.: 424,021

[22] Filed: Apr. 18, 1995

[51] Int. Cl.⁶ .................................................. G02B 26/00
[52] U.S. Cl. .......................... 359/295; 359/224; 359/846
[58] Field of Search .................................. 359/219, 295, 359/292, 224, 214, 290, 230, 223, 846

[56] References Cited

U.S. PATENT DOCUMENTS

| | | | |
|---|---|---|---|
| 4,441,791 | 4/1984 | Hornbeck | 350/360 |
| 4,662,746 | 5/1987 | Hornbeck | 350/269 |
| 4,710,732 | 12/1987 | Hornbeck | 332/7.51 |
| 4,956,619 | 9/1990 | Hornbeck | 330/4.3 |
| 5,061,049 | 12/1991 | Hornbeck | 359/224 |
| 5,079,544 | 1/1992 | DeMond et al. | 340/701 |
| 5,083,857 | 1/1992 | Hornbeck | 359/291 |
| 5,096,279 | 3/1992 | Hornbeck et al. | 359/230 |
| 5,105,369 | 4/1992 | Nelson | 364/525 |
| 5,142,405 | 8/1992 | Hornbeck | 359/197 |
| 5,172,262 | 12/1992 | Hornbeck | 359/223 |
| 5,202,785 | 4/1993 | Nelson | 359/214 |
| 5,212,582 | 5/1993 | Nelson | 359/224 |
| 5,233,456 | 8/1993 | Nelson | 359/214 |
| 5,278,652 | 1/1994 | Urbanus | 358/160 |
| 5,331,454 | 7/1994 | Hornbeck | 359/224 |

*Primary Examiner*—Loha Ben
*Attorney, Agent, or Firm*—Robert C. Klinger; James C. Kesterson; Richard L. Donaldson

[57] ABSTRACT

A spatial light modulator (10) of the DMD type having increased performance parameters. A pixel mirror (30) is supported by a yoke (32), whereby electrostatic attraction forces (70, 76, 80, 82) are generated between several structures. First, between the elevated mirror (30) and an elevated address electrode (50, 52). Second, between the yoke (32) and an underlying address electrode (26, 28). The pixel (30) achieves high address torque, high latching torques, high reset forces, and greater address margins over previous generation devices. The proximity of the yoke (32) over the substrate address electrodes (26, 28) realizes large attraction forces whereby the pixel is less susceptible to address upset, requires lower reset voltages and provides higher switching speeds.

18 Claims, 8 Drawing Sheets

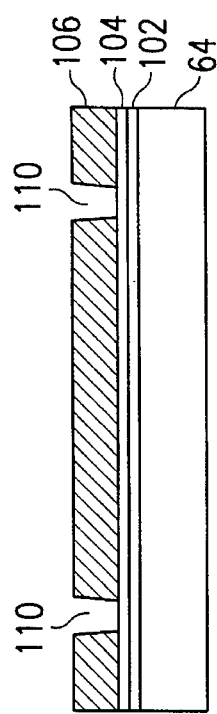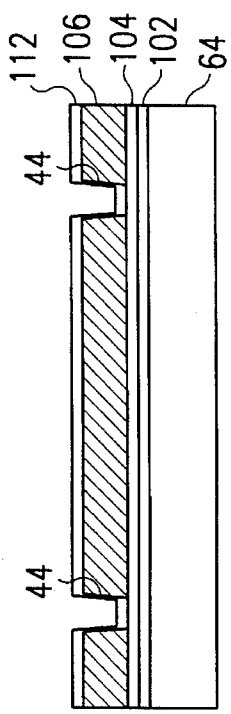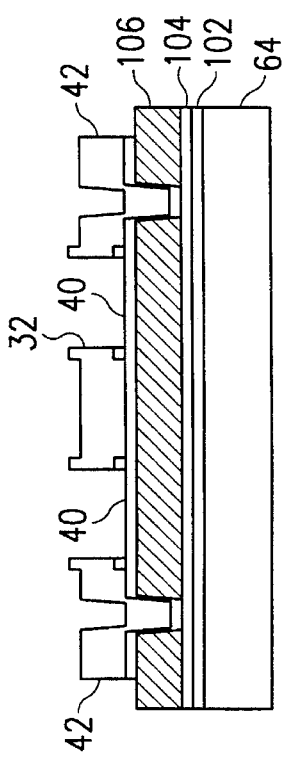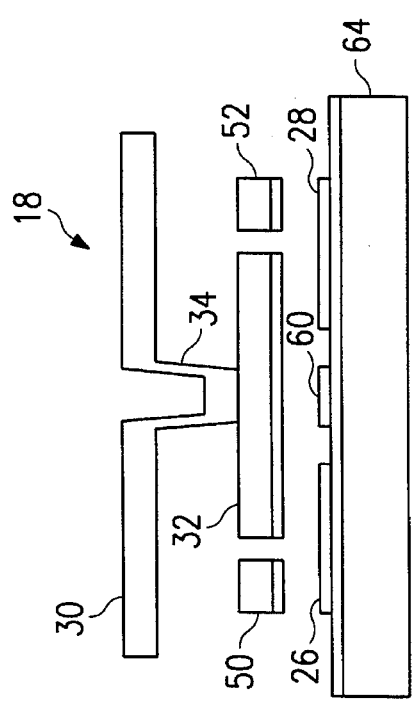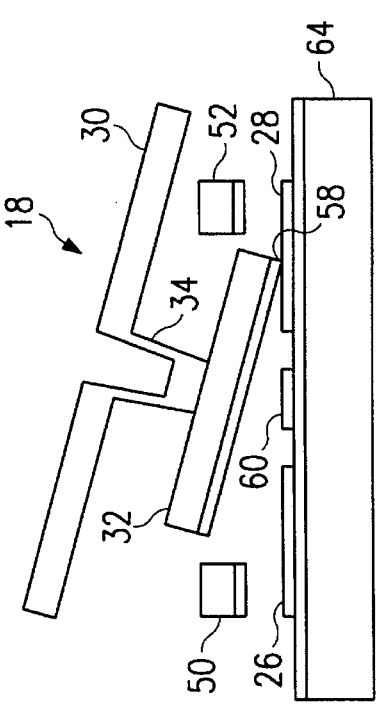

ACTIVE YOKE HIDDEN HINGE DIGITAL MICROMIRROR DEVICE

CROSS REFERENCE TO RELATED APPLICATION

Cross reference is made to the following commonly assigned co-pending patent applications the teachings of which are incorporated herein by reference:

| SER. NO. | TITLE | FILING DATE |
| --- | --- | --- |
| 08/171,303 | Improved Multi-Level Digital Micromirror Device | 12-21-93 |
| 08/239,497 | PFPE Coatings for Micro-Mechanical Devices | 05-09-94 |
| 08/373,692 | Monolithic Programmable Format Pixel Array | 01-17-95 |
| 08/382,566 | Spatial Light Modulator with Buried Passive Charge Storage Cell Array | 02-02-95 |
| 08/300,356 | Pixel Control Circuitry for Spatial Light Modulator | 09-02-94 |
| TI18138 (Attorney's Docket) | Spatial Light Modulator with Superstructure Light Shield | 03-31-95 |
| 08/389,673 | Single Bit Line Split Reset Memory Cell for Digital MicroMirror Device Display Array | 02-16-95 |
| 08/396,024 | Method for Creating a Digital Micromirror Device Using an Aluminum Hard Mask | 02-27-95 |

TECHNICAL FIELD OF THE INVENTION

The present invention is generally related to spatial light modulators for modulating incident light to form an optical light image, and more particularly, to a digital micromirror device (DMD) having an array of bistable micromirrors fabricated over addressing circuitry.

BACKGROUND OF THE INVENTION

Spatial Light Modulators (SLMs) have found numerous applications in the areas of optical information processing, projection displays, video and graphics monitors, televisions, and electrophotographic printing. SLMs are devices that modulate incident light in a spatial pattern to form a light image corresponding to an electrical or optical input. The incident light may be modulated in its phase, intensity, polarization, or direction. The light modulation may be achieved by a variety of materials exhibiting various electro-optic or magneto-optic effects, and by materials that modulate light by surface deformation.

An SLM is typically comprised of an area or linear array of addressable picture elements (pixels). Source pixel data is first formatted by an associated control circuit, usually external to the SLM, and then loaded into the pixel array one frame at a time. This pixel data may be written to the pixel array using a variety of algorithms, i.e. sequentially top-to-bottom one pixel line at a time, interleaving by sequentially addressing top-to-bottom ever other pixel line, such as the odd rows of pixels, and then returning to address the even pixel lines, etc. In cathode ray tubes (CRTs), this data writing technique is know as rasterizing, whereby a high powered electron gun scans across the pixel elements of a phosphor screen left to fight, one line at a time. This pixel address data writing scheme is equally applicable to liquid crystal displays (LCDs) as well.

A recent innovation of Texas Instruments Incorporated of Dallas Tex., is the digital micromirror device or the deformable mirror device (collectively DMD). The DMD is an electro/mechanical/optical SLM suitable for use in displays, projectors and hard copy printers. The DMD is a monolithic single-chip integrated circuit SLM, comprised of a high density array of 16 micron square movable micromirrors on 17 micron centers. These mirrors are fabricated over address circuitry including an array of SRAM cells and address electrodes. Each mirror forms one pixel of the DMD array and is bistable, that is to say, stable in one of two positions, wherein a source of light directed upon the mirror array will be reflected in one of two directions. In one stable "on" mirror position, incident light to that mirror will be reflected to a projector lens and focused on a display screen or a photosensitive element of a printer. In the other "off" mirror position, light directed on the mirror will be deflected to a light absorber. Each mirror of the array is individually controlled to either direct incident light into the projector lens, or to the light absorber. The projector lens ultimately focuses and magnifies the modulated light from the pixel mirrors onto a display screen and produce an image in the case of a display. If each pixel mirror of the DMD array is in the "on" position, the displayed image will be an array of bright pixels.

For a more detailed discussion of the DMD device and uses, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention and the teachings of each are incorporated herein by reference. Gray scale of the pixels forming the image is achieved by pulse-width modulation techniques of the mirrors, such as that described in U.S. Pat. No. 5,278,652, entitled "DMD Architecture and Timing for Use in a Pulse-Width Modulated Display System", assigned to the same assignee of the present invention, and the teachings of which are incorporated herein by reference.

The DMD is revolutionary in that it is truly a digital display device and an integrated circuit solution. The evolution and variations of the DMD can be appreciated through a reading of several commonly assigned patents. The "first generation" of DMD spatial light modulators implemented a deflectable beam wherein the mirror and the beam were one in the same. That is, an electrostatic force was created between the mirror and the underlying address electrode to induce deflection thereof. The deflection of these mirrors can be variable and operate in the analog mode, and may comprise a leaf-spring or cantilevered beam, as disclosed in commonly assigned U.S. Pat. No. 4,662,746 to Hornbeck, entitled "Spatial Light Modulator and Method", U.S. Pat. No. 4,710,732 to Hornbeck, entitled "Spatial Light Modulator and Method", U.S. Pat. No. 4,956,619 to Hornbeck, entitled "Spatial Light Modulator", and U.S. Pat. No. 5,172,262 to Hornbeck, entitled "Spatial Light Modulator and Method", the teachings of each incorporated herein by reference.

This first generation DMD can also be embodied as a digital or bistable device. The beam (mirror) can include a mirror supported by a torsion hinge and axially rotated one of two directions 10 degrees, until the mirror tip lands upon a landing pad. Such an embodiment is disclosed in commonly assigned U.S. Pat. No. 5,061,049 to Hornbeck entitled "Spatial Light Modulator and Method". To limit the Van der Waals forces between the mirror tips and the landing pads, the landing pads may be passivated by an oriented monolayer formed upon the landing pad. This monolayer decreases the Van der Waals forces and prevents sticking of the mirror to the electrode. This technique is disclosed in commonly assigned U.S. Pat. No. 5,331,454 to Hornbeck, entitled "Low Reset Voltage Process for DMD", the teachings included herein by reference.

A "second generation" of the DMD is embodied in commonly assigned U.S. Pat. No. 5,083,857 entitled "Multi-Level Deformable Mirror Device", as well as in copending patent application Ser. No. 08/171,303 entitled "Improved Multi-Level Digital Micromirror Device, filed Dec. 21, 1993. In this second generation device, the mirror is elevated above a yoke, this yoke being suspended over the addressing circuitry by a pair of torsion hinges. As depicted in FIG. 3c of this application, an electrostatic force is generated between the elevated mirror and an elevated electrode. When rotated, it is the yoke that comes into contact with a landing electrode, whereby the mirror tips never come into contact with any structure. The shorter moment arm of the yoke, being about 50% of the mirror, allows energy to be more efficiently coupled into the mirror by reset pulses due to the fact that the mirror tip is free to move. Applying resonant reset pulses to the mirror to help free the pivoting structure from the landing electrode is disclosed in commonly assigned U.S. Pat. No. 5,096,279, entitled "Spatial Light Modulator and Method, and U.S. Pat. No. 5,233,456 entitled "Resonant Mirror and Method of Manufacture". However, some of the address torque generated between the mirror and the elevated address electrode is sacrificed compared to the first generation devices because the yoke slightly diminishes the surface area of the address electrode.

It is desired to provide an improved DMD having a more efficient reset action, and to develop a device with more address torque, latching torque, and address holding torque. The improved device would preferably be fabricated using the baseline fabrication processes.

SUMMARY OF THE INVENTION

The present invention achieves technical advantages as a DMD spatial light modulator by laterally extending the yoke in a direction parallel to the hinges, so that the yoke overlaps a substantial portion of a first pair of address electrodes. A second pair of elevated address electrodes are provided lateral of the yoke and beneath an elevated mirror supported by the yoke. Address torque is achieved between the first pair of address electrodes and the yoke, and between the elevated second pair of address electrodes and the elevated mirror. The yoke is spaced closer to the underlying address electrodes than the mirror is positioned relative to the elevated address electrodes. Since force per unit area between the opposing members is proportional to one over the square of the distances, the force per unit area between the yoke and the underlying first pair of address electrodes is up to 4× greater than the force per unit area between the mirror and the elevated second pair of address electrodes. The present invention has superior address torque, latching torque, address holding torque and reset force compared to earlier generations, with no change in process flow.

The present invention comprises a spatial light modulator including a substrate. Addressing circuitry comprising a first portion is provided proximate the substrate, and also comprises a second portion elevated above the substrate. A yoke is supported over the first portion of the addressing circuitry. At least one hinge is connected to the yoke and supports the yoke, with the hinge permitting deflection of the yoke over the addressing circuitry first portion. A pixel is elevated above and supported by the yoke, this pixel being positioned over the elevated addressing circuitry second portion. The first and second portions of the addressing circuitry are electrically connected to one another, whereby a potential provided to the first and second portions creates an electrostatic force in two places. First, an electrostatic force is generated between the yoke and the addressing circuitry first portion, and secondly, between the elevated pixel and the elevated second portion.

The distance between the yoke and the first portion is approximately half the distance defined between the pixel and the elevated second portion. The opposing surface areas of the yoke and address circuitry first portion realize an addressing torque that is approximately 4× greater than the addressing torque generated between the elevated pixel and the elevated second electrode. The net address torque is additive, and is substantially greater than the address torque generated by earlier generation DMD devices.

The yoke preferably has a butterfly like shape, having a pair of yoke tips on each side of a yoke axis. When rotated, one pair of yoke tips lands upon a landing pad, whereby the supported and elevated pixel mirror remains free of any structure. Thus, reset pulses can be provided to the mirror, preferably at a frequency being the resonant frequency of the mirror to achieve a good reset action. The yoke is preferably in substantially the same plane as the hinges and may be fabricated using a single etch process so that the hinges are formed for precision alignment and balancing.

The spatial light modulator further comprises control circuitry connected to the addressing circuitry. This control circuitry provides address data to both the first and second portions of the addressing circuitry to cause deflection of the pixel. Preferably, a first portion of the addressing circuitry, comprising a pad, is provided each side of the pixel axis of rotation, with a separate second portion of the addressing circuitry being provided under the pixel each side of this yoke axis. The control circuitry provides address data to one of either of these sets of addressing portions to cause deflection of the yoke and mirror toward the addressing portions to cause deflection of the yoke and mirror toward the addressed first and second portions. Preferably, the pixel is a mirror, having a rectangular shape with geometrically oriented edges at 45° with respect to the hinge to minimize diffraction terms generated along the edges of the pixel that are perceived by darkfield optics.

The DMD device having a yoke suspended over a pair of address electrodes, and supporting an elevated mirror extending over a second pair of address electrodes, achieves a significant increase in the attractive area between address electrodes and the pivotable structure, namely, the yoke and the mirror. The underlying address electrodes on the substrate, comprised of metal 3, are carefully designed to maximize the attractive area while permitting the yoke tips to land on landing electrodes having the same potential as the mirror and yoke. The elevated address electrodes for the mirror have been modified from the second generation device to accommodate the extended yoke of the present invention, while maintaining most of the torque that can be generated between the mirror and elevated electrodes. Any lost torque due to a reduced area of the elevated electrodes is more than compensated for by the yoke extensions overlying the address electrodes, these address electrodes being positioned half the distance from the yoke than the mirror is positioned to the elevated electrodes. The net address torque that can be generated compared to the second generation device is almost a factor of two greater. The present invention also achieves a greater latching torque and address holding torque.

BRIEF DESCRIPTION OF THE DRAWINGS

FIG. 6 is cross-sectional view of one pixel of the DMD array of FIG. 1 taken along the hinge axis to illustrate the elevated mirror address electrodes and the yoke supported over a pair of substrate address electrodes;

FIG. 7 is also a cross-sectional view such as that of FIG. 6, with the yoke and the mirror supported thereon together being rotated to one stable state, whereby the yoke tips land upon a pair of respective landing pads, while the elevated mirror remains proximate but spaced from the elevated mirror address electrodes;

FIG. 8–13 sequentially illustrate the various layers of semiconductor material which are processed to fabricate the pixel of FIG. 2 using conventional robust semiconductor processing techniques;

DETAILED DESCRIPTION OF THE PREFERRED EMBODIMENT

Figure 1:
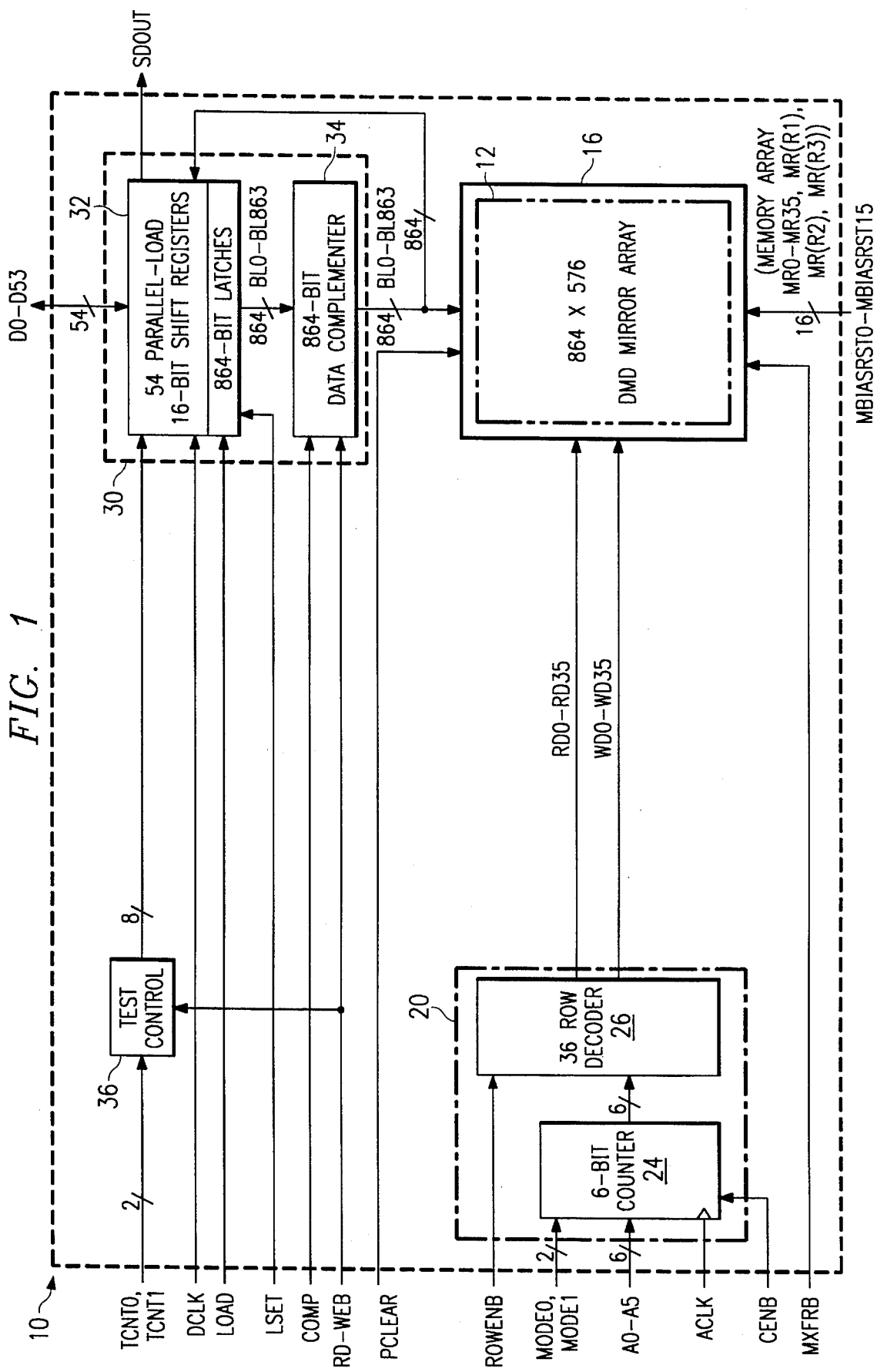
FIG. 1 is a block diagram of a spatial light modulator according to the preferred embodiment of the present invention, including row address and column data loading circuitry for controlling an array of pixels comprising micromirrors.

Referring now to FIG. 1, a spatial light modulator comprising a digital micromirror device (DMD) is generally shown at 10. DMD 10 is a single-chip integrated circuit seen to include an 864×576 micromirror array 12. Array 12 is monolithically fabricated over a 864×36 memory cell array 16. Each memory cell in the 36 memory cells rows (MR0-MR35) forming memory cell array 16 is associated with and controlling a dedicated group of sixteen (16) pixels 18, shown in FIG. 2. Each memory cell comprises a primary 1-bit static random access memory (SRAM) cell, and a secondary 1-bit SRAM cell fed by the primary cell. There are 864 bit lines BL0-BL863 connected to one of each of the 864 columns of memory cells. Column pixel data is loaded into the addressed primary memory cell row $MR_n$ via the associated bit lines BL0-BL863. The primary memory cell is addressed by enabling the associated row write or read enable line, identified as the $WD_n$ or $RD_n$, respectively, whereby $WP_n$ is connected to the enable input of each primary cell in the row $MR_n$. This pixel data is latched from the primary cell into the respective secondary cell by enabling the global control line MXFRB, the MXFRB line being connected to the enable input of all secondary cells of array 16. The secondary memory cell essentially operates as a shadow latch, whereby data can be loaded from the primary memory cell into the secondary memory cell, allowing the primary memory cell to then be subsequently reloaded with new pixel data without effecting the memory cell contents of the secondary memory cell. For additional discussion of this shadow latch technique, cross reference is made to commonly assigned co-pending patent application Ser. No. 08/389,673 entitled "Spatial Light Modulator Having Single Bit-Line Dual-Latch Memory Cells", filed Feb. 16, 1995, the teachings of which are incorporated herein by reference. For a more detailed discussion of the control circuitry, including the row address and column data loading circuitry, as well as the test control functions of DMD 10, cross reference is made to commonly assigned co-pending patent application Ser. No. 08/373,692, entitled "Monolithic Programmable Format Pixel Array" filed Jan. 17, 1995, the teaching of which are included herein by reference.

Figure 2:
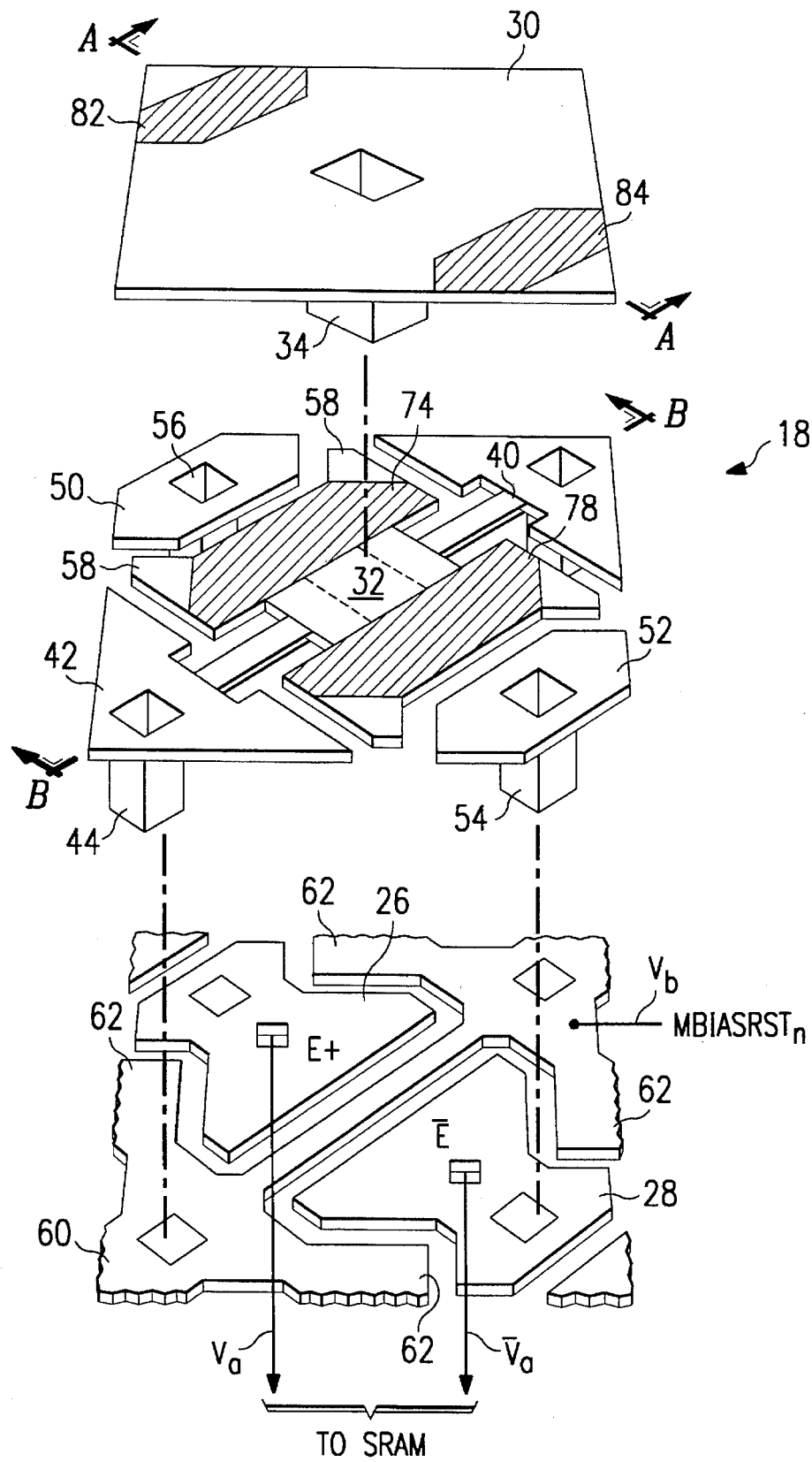
FIG. 2 is an exploded perspective view of one DMD pixel of the array shown in FIG. 1, including an elevated micromirror fabricated upon a deflectable yoke, the yoke in turn being supported by a pair of hinges, the hashed areas illustrating the region of electrostatic attraction between the elevated mirror and an elevated address electrode, and between the yoke and the underlying address electrode comprising metal 3 upon the substrate.

Referring now to FIG. 2, one pixel 18 of mirror array 12 is shown. The data of the secondary memory cell is provided to a pair of complementary address electrode lines, each line in turn being connected to one of two address electrodes 26 and 28 fabricated under and associated with each pixel 18 of array 12. Pixel 18 is seen to include a square mirror 30 supported upon and elevated above a yoke generally shown at 32 by a support post 34. Support post 34 extends downward from the center of the mirror, and is attached to the center of the yoke 32 along a torsion axis thereof, as shown, to balance the center of mass of mirror 30 upon yoke 32. Yoke 32 has a generally butterfly shape, that will be discussed in more detail shortly, and is axially supported along a central axis thereof by a pair of torsion hinges 40. The other end of each torsion hinge 40 is attached to and supported by a hinge support post cap 42 defined on top of a respective hinge support post 44. A pair of elevated rain or address electrodes 50 and 52 are supported by a respective address support post 54 and 56.

The address support post 54 and 56, and the hinge support posts 44 support the address electrodes 50 and 52, the torsion hinges 40, and the yoke 32 away from and above a bias/reset bus 60, and the pair of substrate level address electrode pads 26 and 28. When mirror 30 and yoke 32 are together rotated about the torsion axis of the yoke, defined by the hinges 40, a pair of yoke tips 58 on the side of the yoke 32 that is deflected land upon and engage the bias/reset bus 60 at the landing sites 62.

Figure 5:
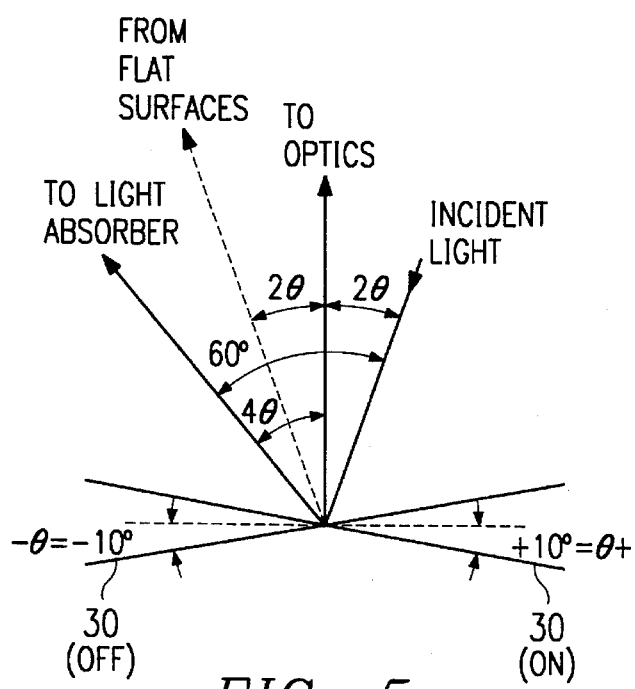
FIG. 5 is an illustration of the two stable deflected states of the pixel mirror shown in FIG. 4 for deflecting incident light in one of two directions.

Referring now to FIG. 2 in conjunction with FIG. 3, a technical advantage of pixel 18 according to the preferred embodiment of the present invention will be discussed in considerable detail. Rotation of mirror 30 and yoke 32 can be achieved in one of two directions, to achieve a bistable state and modulate incident light as shown in FIG. 5 and will be discussed shortly. An address voltage is provided to one of the two address electrodes pads 26 or 28, and to one of the corresponding elevated mirror address electrode 50 or 52 via the associated electrode support post 54 and 56. This address voltage may be 5 volts which is compatible with CMOS logic circuitry, but could also comprise of other levels if desired. At the same time, +15 volt bias voltage is provided to bias/reset bus 60, and thus to yoke 32 via support post 44, post caps 42 and hinges 40, as well as to mirror 30 via support 34. The present invention achieves technical advantages by providing an electrostatic force between opposing surfaces at two locations illustrated by the hatched areas in FIG. 2. These electrostatic attractive forces are also illustrated at 70, 76, 80 and 82 in FIG. 3.

By way of example, if mirror 30 and yoke 32 are to be rotated counter address line $V_a$ while +5 volts is provided on the complementary address line $\overline{V}_a$. Thereafter, a +15 volt potential is provided on the bias line $V_b$ to the bias/reset bus 60 to provide a +15 volt potential on yoke 32 and mirror 30. An electrostatic attraction force from the 20 volt differential is generated between address electrode 26 and the portion of yoke 32 above this substrate address electrode, this force being shown generally at 70. The corresponding portion of yoke 32 that over hangs the addressed electrode 26 is shown by the hatched portion illustrated at 74. Conversely, if the mirror was to be rotated in a clockwise direction, a 0 volt potential would be provided to the complement address electrode 28, to generate an attractive force at 76, with the corresponding portion of the yoke 32 over hanging address electrode 28 being shown by the hatched region at 78.

Figure 3:
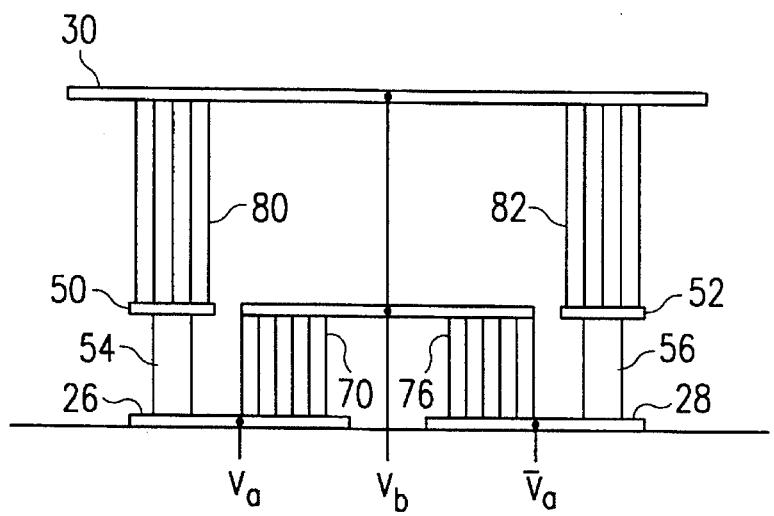
FIG. 3 is an illustration of the electrostatic attraction forces between the mirror and the elevated address electrode, and between the yoke and the underlying address electrode, the yoke and mirror being electrically connected to a bias/reset bus and having the same voltage bias.

While an electrostatic attraction force is being generated at 70 between one half of yoke 32 and the underlying address electrode 26, an electrostatic attractive force is also being generated between the elevated address electrode 50 and mirror 30 as shown at 80 in FIG. 3. This electrostatic attractive force is generated by the voltage potential created between the portion of mirror 30, shown at 82, defined above the elevated address electrode 50. The portion of mirror 30 overhanging address electrode 52 is shown at 84. Therefore, by addressing one address electrode 26 or 28, which in turn provides an address voltage to the corresponding elevated address electrode 50 or 52, electrostatic attraction force is generated at two places, shown at 70 and 80, or at 76 or 82. Selectively applying this 0 volt address potential to one of the two address electrodes 26 or 28 determines which way mirror 30 and yoke 32 will rotate once the +15 volt potential is applied to the bias bus 60, and consequently to the yoke 32 and mirror 30.

Referring to FIG. 3, it can be seen that the elevated address electrodes 50 and 52 are generally co-planar with the yoke 32, each being spaced above the address electrodes 26 and 28 a distance of about 1 micron. The separation of mirror 30 above the elevated address electrodes 50 and 52 is approximately double this distance, or about 2 microns. Since the attractive force between opposing surfaces varies directly as a function of one over the square of the distance between the opposing surfaces, the electrostatic attractive force generated between yoke 32 and the address electrodes 26 and 28 per unit area is four times as great as the attractive force generated between mirror 30 and the corresponding elevated address electrode 50 and 52. The forces generated each side of the torsion axis are additive, and together cause mirror 30 and yoke 32 to be rotated in the direction toward the address electrodes.

In an alternative embodiment, elevated electrodes 50 and 52 and their corresponding support posts can be eliminated. In this embodiment, the height of mirror 30 above yoke 32 is only about 1 micron to achieve a strong attractive force with the underlying distal lobe of electrodes 26 and 28. When deflected, the mirror 30 will rotate toward, but will still not engage, the corresponding distal lobe of the address electrodes 26 and 28. In this embodiment, the elevated structure including the posts 44, yoke 32 and mirror 30 are all of equal potential and the risk of a short is avoided. Thus, limitation to one set of elevated electrodes is not to be inferred.

The address torque ($T_a$) is the torque produced by the address voltage alone with the yoke 32 and the mirror 30. This address torque is significantly greater than the address torque generated by previous generation DMD devices for like address voltages and bias potentials. The present invention thus has an improved address margin, which is defined as the difference between the address voltage $V_a$ and the potential that is required to ensure the mirror is rotated the proper direction when the bias voltage is applied.

The pixel of the present invention also has an increased latching torque ($T_l$), which is defined as a measure of the latching torque produced by the bias voltage in the presence of an address voltage tending to rotate (or upset) the mirror to the opposite state. Another dramatically improved performance parameter of the present invention is an increased address-holding torque ($T_h$), which is defined as a measure of the ability of the address voltage to hold the mirror in its landed state after reset during the time that the bias voltage is off. Another improved feature of the present invention is an increased reset force ($F_r$), which is defined as a measure of the tip reaction force produced by a combination of a single-pulse reset and the restoring force produced by the tip of the hinge.

All four of these performance parameters are substantially improved by the present invention over previous generation DMD devices due to the design of the yoke 32 generating an electrostatic attractive force with the underlying address electrodes, in combination with electrostatic attractive forces being generated between the elevated mirror and the elevated address electrodes. Due to the proximity of the rotatable yoke above the address electrodes, and a substantial opposing surface area thereof, all of the above mentioned performance parameters are significantly increased, and contribute to the increased electromechanical efficiency of the DMD device. In particular, for no change in hinge stiffness, a 1.8× higher address torque is achieved over previous generation devices. The latching torque is improved by 2.6× over that of previous DMD devices. The reset force generated is an 8.8× increase over that of previous generation DMD devices. With all the improved performance parameters, the process for fabricating the present invention, as will be described shortly, is nearly identical to that for the previous generation devices, thus providing a "something for nothing" benefit over previous generation devices.

The implications of the DMD device of the present invention includes greater address margin, as discussed, less susceptibility to address upset, lower reset voltage requirements, and higher switching speeds which is critical in the operation of the device as a spatial light modulator. With the present design, non-linear hinges can even be incorporated, with stiffer hinges if desired due to improve address margins and latching margins.

To reduce the possibility of stiction due to Van der Waals forces, the landing electrodes 60, specifically at regions 62 corresponding with the point of contact from tips 58 of yoke 32, can be passivated. By passivating the landing electrodes, the tendency for the yoke 32 to adhere or stick can be decreased. Stiction is an inhibiting force that requires large reset voltages to be applied to reset the mirror to a flat state, or to switch the mirror to the opposing deflectable bistable state. Methods of passivating the landing electrodes are disclosed in commonly assigned U.S. Pat. No. 5,331,454 to Hornbeck, entitled "Low Reset Voltage Process for DMD", and in commonly assigned co-pending patent application Ser. No. 08/239,497 entitled "PFPE Coatings for Micro-Mechanical Devices", filed May 9, 1994, the teaching of each incorporated herein by reference. To achieve reset of the mirror, and induce deflection of the mirror to the other bistable state, the bias/reset line can be pulsed with a voltage at a frequency corresponding to the resonant frequency of the mirror, which is typically about 5 MHZ, such as disclosed in commonly assigned U.S. Pat. No. 5,096,279, entitled "Spatial Light Modulator and Method", the teachings of which are incorporated herein by reference.

Figure 4:
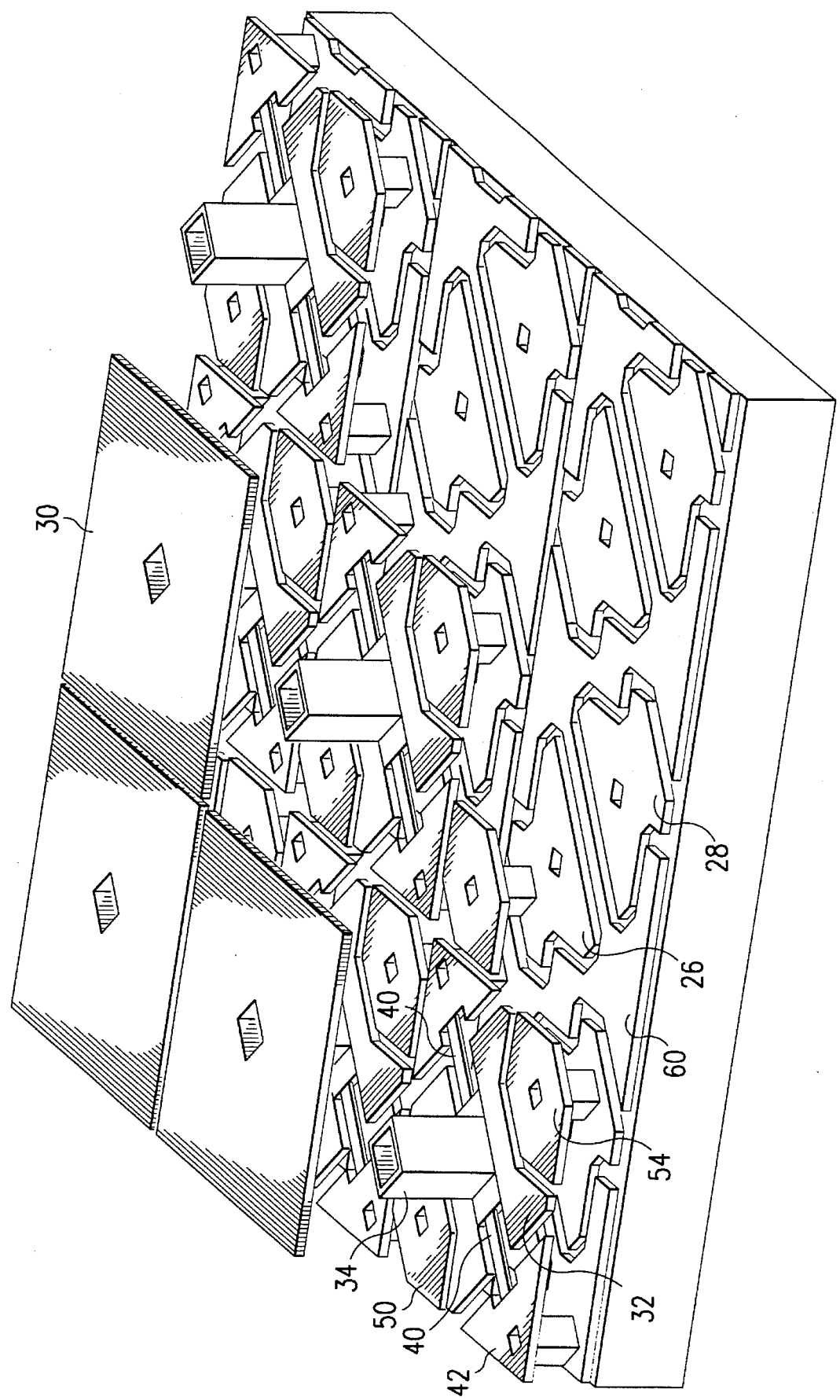
FIG. 4 is a sectioned view of a 3×3 array of pixels from that array shown in FIG. 1, with some of the yokes, elevated address electrodes, and hinge support posts being removed to illustrate the metal 3 layer defining the substrate level address electrodes and the substrate level bias/reset patterns, and also illustrating some of the elevated mirrors being removed to depict the elevated yoke which overlaps portions of the underlying substrate level address electrodes.

Turning now to FIG. 4, a sectioned perspective view of a 3×3 array portion of array 12 is shown to illustrate the fabrication of the metal 3 layer upon the silicon substrate, this metal 3 layer defining the address electrodes and the bias/reset buses upon the silicon substrate. Also illustrated is the elevated mirror address electrodes, the post caps, and the hinges supporting yoke 32 above the metal 3 layer. The mirror support post can be seen to be supported by the respective yoke along the torsion axis of the pixel.

Turning now to FIG. 5, an optical schematic diagram is shown whereby incident light is seen to be modulated and deflected in one of two directions, depending on whether the mirror is in the "on" or "off" state. When mirror 30 is in the on state, incident light is reflected to optics including a projector lens, and ultimately focused upon a display screen in the case of a front or rear screen projector, or focused upon a photosensitive surface in the case of a electrophotographic printer. When mirror 30 is in the off position, incident light is reflected to a light absorber and away from the darkfield optics. The 20° rotation between the bistable states of mirror 30 achieves a 40° swing of reflective incident light. Thus, the present invention achieves a high contrast ratio spatial light image, which is critical for use in darkfield optics systems for which the spatial light modulator of the present invention is intended.

Referring now to FIGS. 6 and 7, a cross sectional view of pixel 18 taken alone line A—A in FIG. 2 is shown with the support posts not being shown. As shown in FIG. 6, with yoke 32 and mirror 30 in the undeflected (flat) state, yoke 32 is generally coplanar with the elevated address electrodes 50 and 52, at a distance of about 1 micron above the metal 3 layer including address electrodes 26 and 28, and reset/bias bus 60. Mirror 30 is elevated above the pair of elevated address electrodes 50 and 52 about 2 microns, which is approximately double the distance separating the yoke from the substrate 64.

Referring to FIG. 7, when yoke 32 and mirror 30 are addressed and rotated in a clockwise direction, as shown, the pair of landing tips 58 of the addressed half of yoke 32 land upon portions 62 of reset/bias bus 60. However, the elevated mirror 30, while rotated therewith, remains spaced above and separated from the corresponding elevated address electrode 52. As shown, the moment arm of yoke 32 is about half the moment arm of mirror 30 about the torsion axis. The shorter dimension of the landing yoke 32 compared to the mirror 30 reduces the torque necessary to reset a stuck mirror, while using too short a landing yoke can cause additional stress on the torsion hinges. A better understanding of these forces is described in commonly assigned co-pending patent application Ser. No. 08/171,303, entitled "Multi-Level Digital Micromirror Device", filed Dec. 21, 1993, the teachings of which are incorporated herein by reference. Since the yoke 32 lands upon a pair of opposing tips 58, and is symmetrically designed, a large area of address electrode 26 and 28 can be defined under yoke 32, as shown in FIG. 2. In addition, reduced stiction forces between the yoke and the landing electrode portions 62 has been observed, thus necessitating a lower reset voltage to be applied when changing or resetting the mirror state.

Referring now to FIGS. 8–13, a detailed discussion of the semiconductor fabrication processes performed to fabricate one pixel 18 will be described. In each of the Figures, the section view is taken alone line B—B in FIG. 2 for purposes of illustration and clarity, although it is not to scale.

First, referring to FIG. 8, a silicon substrate 64 is processed so as to form the underlying address circuitry including the array of memory cells 16, the row address circuitry 20, and the column data loading circuitry 30. Thereafter, substrate 64 is covered with a protective oxide layer 102. Next, a third layer of metalization, commonly referred to as M3, is sputter deposited onto the partially processed wafer and being shown at 104. This third metalization layer is patterned and etched to define the address electrodes 26 and 28, as well as the bias/reset bus 60 shown in FIG. 2 and FIG. 4. Next, a hinge spacer layer 106 is spin-deposited over the address circuitry and preferably comprises positive photoresist having a thickness of 1 micron. A pair of vias 110 are opened through the photoresist layer 106 to facilitate forming the hinge support post, then the layer of photoresist 106 is deep UV hardened at a high temperature to prevent flow and bubbling during subsequent processing steps.

Referring now to FIG. 9, a thin hinge layer 112 of metalization is sputter deposited over the photoresist layer 106 and into vias 110, as shown. Hinge layer 112 preferably has a thickness of about 500 Angstroms, and can be comprised of aluminum, aluminum alloys, titanium tungsten, and other conductive materials well suited for the present invention. The hinge support posts 44 are defined in this step as shown, and are electrically connected to bias/reset bus 60. Also during this step, the pair of electrode support posts 54 and 56 are defined, although not shown, whereby the layer 112 is sputter deposited in a pair of corresponding vias formed in photoresist 106, these vias having been formed during the previous step when vias 110 were opened. Thus, the electrode support post and the hinge support post are very similar. The thickness of the photoresist spacer layer 106 determines the hinge air gap, and thus, determines the mirror rotation angle due to the angular freedom of yoke 32 until it engages the landing electrodes.

Referring now to FIG. 10, a first mask of oxide is plasma-deposited, and patterned in the shape of the hinges 40. Then, a thick metal layer, typically about 3,000 Angstroms thick, of aluminum alloy is deposited. A second mask of oxide is plasma-deposited and then patterned in the shape of the yoke 32, the elevated electrodes 54 and 56, and the hinge support caps 42. The thin hinge layer 112 and the thicker metal layer are then etched to define the address electrodes 50 and 52, the hinge support caps 42, and the hinges 40, as shown. A single plasma etch is used to define these structures. The two oxide layers act as etch stops, and protect the metal layers beneath them. After completion of the plasma etch process, the oxide etch stops are removed from the thin metal hinges, the thicker metal support posts caps 42, the electrodes 50 and 54, and from the hinges 40, as shown in FIG. 10.

Figure 11:
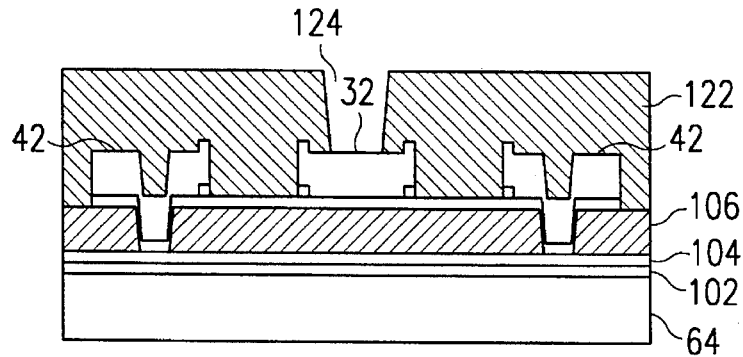

Referring now to FIG. 11, a thick mirror spacer layer 122 is spin-deposited over the hinges, electrodes and hinge support caps, and preferably comprises positive photoresist having a thickness of approximately 2 microns. A via 124 is opened in this photoresist spacer layer 122 to provide an opening above yoke 32, as shown, then the layer of photoresist 122 is deep UV hardened.

Figure 12:
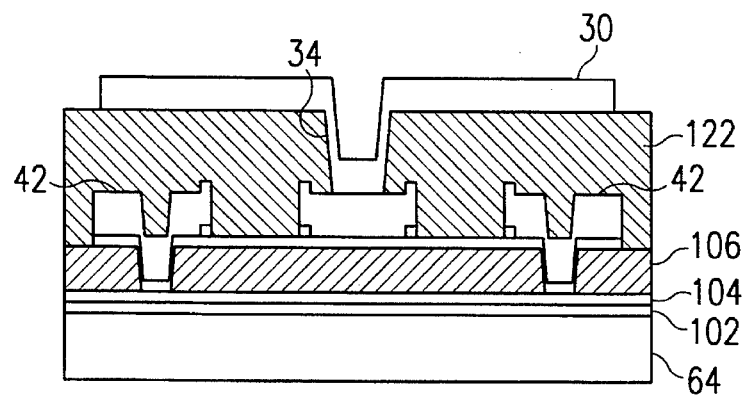
Figure 13:
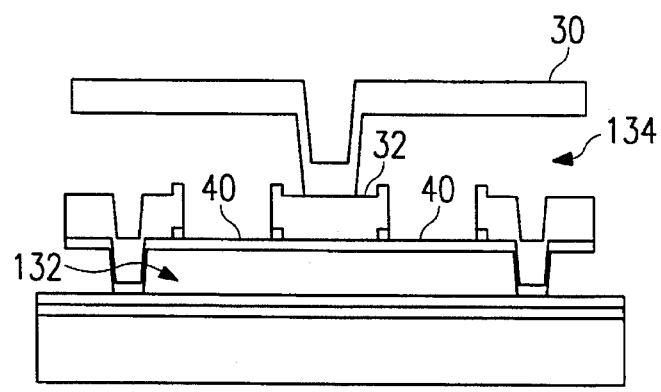

Referring to FIG. 12, a mirror metal layer, comprising of an aluminum alloy and having reflective properties, is then sputter-deposited to a thickness of about 4,000 Angstroms. This layer forms both the mirror support post 34 and the mirror 30. A masking oxide layer is then plasma-deposited onto the mirror layer, and patterned in the shape of the rectangular mirrors. The mirror metal layer is then plasma etched to form the mirror 30 and support post 34, as shown. The masking oxide layer is typically left in place while the wafer is subsequently processed and sawed to obtain dies. Referring to FIG. 13, the chips are placed in a plasma etching chamber, where the masking oxide layer and both spacer layers 106 and 122 are plasma etched away, leaving the hinge air gap under the hinges 40 and yoke 32, as well as a mirror air gap 134 beneath the elevated mirror 30.

Figure 14:
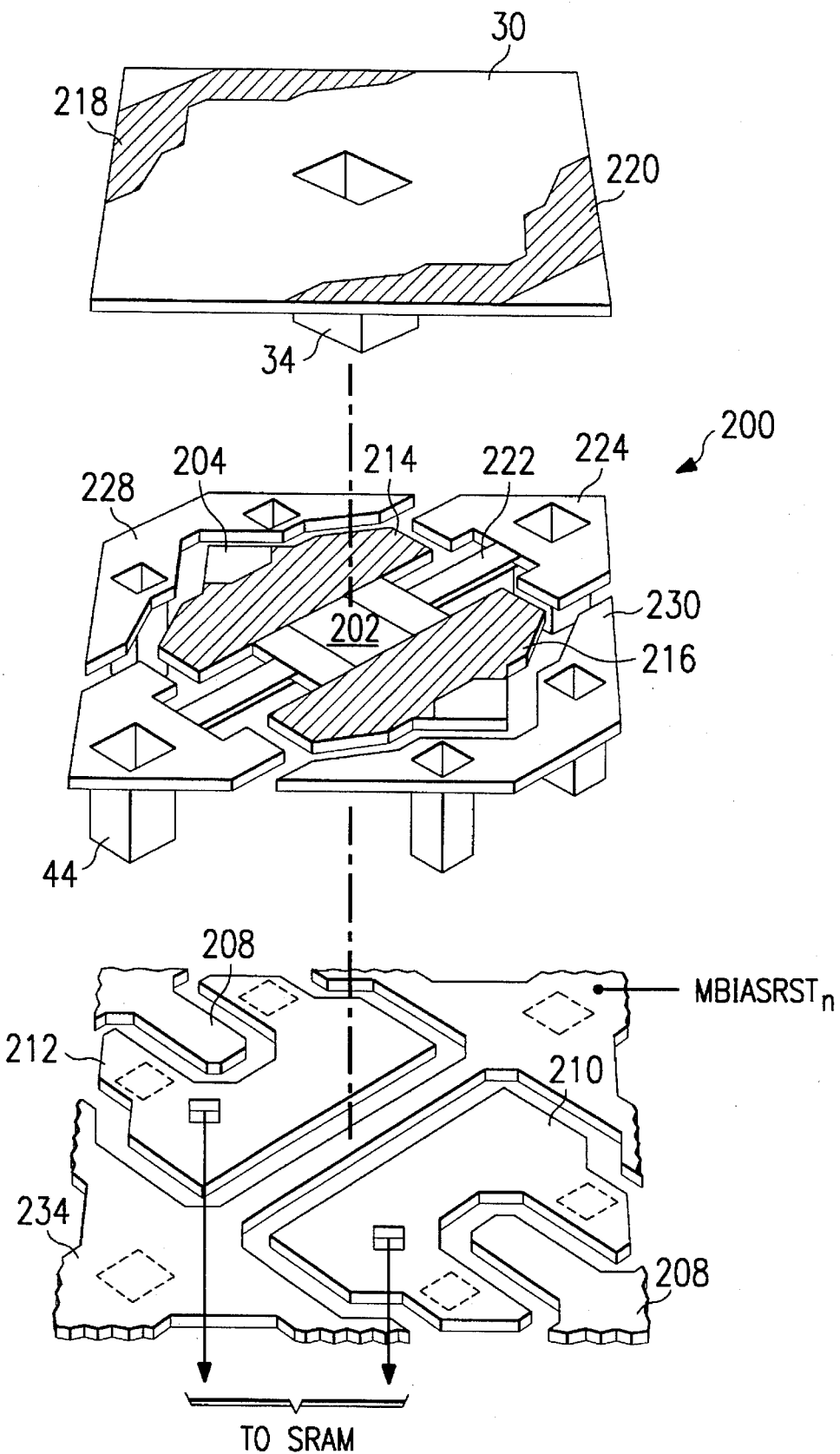
FIG. 14 is a exploded perspective view of an alternative preferred embodiment of the present invention whereby the yoke has only one landing tip defined each side of the torsion axis.

Referring now to FIG. 14, a perspective exploded view of an alternative embodiment of the present invention is generally shown at 200. Pixel 200 is seen to be very similar to pixel 18 as discussed in regards to FIG. 1–13, wherein like numerals refer to like elements. However, pixel 200 has a yoke 202 which is slightly modified to have a single landing tip 204 each side of the torsion axis, as shown. When rotated, one tip 204 of yoke 202 will rotate until it engages and lands upon a corresponding landing electrode 208. The yoke 202 substantially overlaps each of a pair of address pads 210 and 212 formed from the metal 3 layer upon the substrate. The corresponding regions of opposing surfaces that create the electrostatic attraction forces are shown and hatched areas at 214, 216, 218, and 220, as shown. Hinges 222 support yoke 202 from hinge posts 224. Elevated address electrodes 228 and 230 are coplanar with yoke 202.

Figure 15:
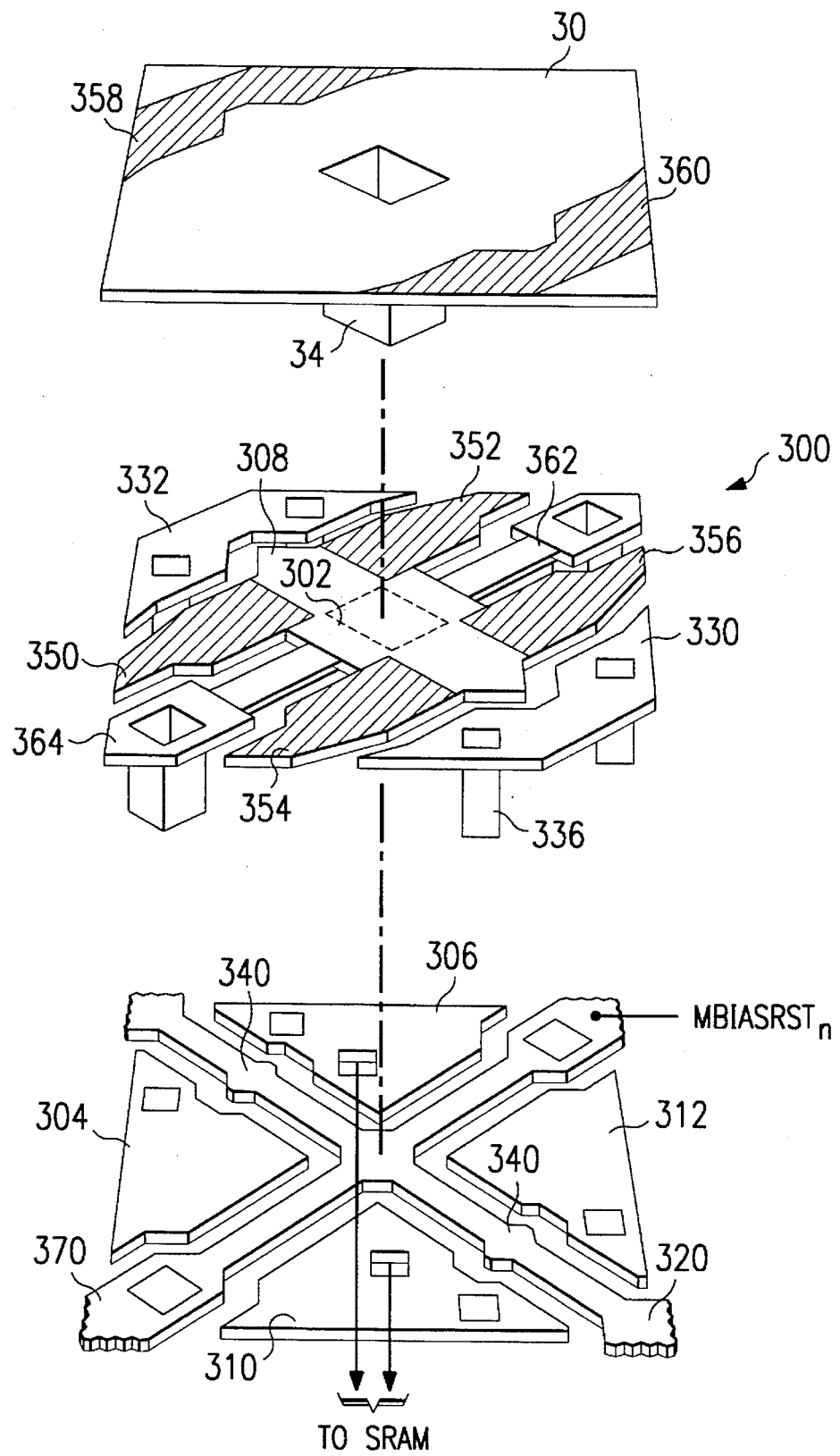
FIG. 15 is an exploded perspective view of yet another alternative preferred embodiment of the present invention, whereby the yoke has a single landing tip each side of the torsion axis, and wherein the yoke is extended parallel to the torsion axis over the underlying substrate address electrode.

Referring now to FIG. 15, yet another alternative preferred embodiment of the present invention is shown at 300. Pixel 300 is very similar to the embodiment shown in FIG. 200, and to that pixel 18 shown in FIG. 1–13, where like numerals refer to like elements. Pixel 300, as shown, also has a single landing tip provided each side of the torsion axis, similar to the embodiment in FIG. 14. A yoke 302 is substantially extended parallel to the torsion axis and over the underlying address electrodes, where a pair of address electrodes 304 and 306 are provided beneath one side of yoke 302, and another pair of address electrodes 310 and 312 are provided on the other side of the bias/reset bus 320 which has an X-pattern, as shown. The two address electrodes 304 and 306 are electrically tied to one another, and the other pair of address electrodes 310 and 312 are electrically tied together. The pairs of address electrodes are electrically connected to the elevated mirror address electrodes 330 and 332 via a corresponding support post 336, as shown. The areas of electrostatic attraction are shown by the hatched areas of 350, 352, 354, 356, 358 and 360. Hinges 362 support yoke 302 from posts 364. In this embodiment, the bias/reset bus 320 has an X-shape, and bifurcates the pair of address electrodes, as shown. With an X-shape, the bias/reset bus can be easily and conveniently interconnected to adjacent pixels in the metal 3 layer upon the silicon substrate. This may yield a desirable layout for controlling multiple rows of pixels with a common bias/reset bus, and also facilitates the split-reset technique, such as disclosed in commonly assigned U.S. Patent application Ser. No. 08/300, 356, entitled "Pixel Control Circuitry for Spatial Light Modulator", filed Feb. 16, 1995, the teachings of which are incorporated herein by reference. The landing cites of the yoke tips are provided along the bias/reset bus, shown at 340.

In summary, a spatial light modulator of the DMD type is disclosed having electrostatic forces generated at two locations to induce deflection of the pixel mirror. First, an attractive force is generated between the yoke and an underlying substrate address electrode. Secondly, an electrostatic force is also generated between the elevated mirror and an elevated address electrode. These electrostatic forces are additive, and realize improved performance parameters over prior generation DMD devices. Since the yoke is separated above the substrate address electrodes by a distance equal to one-half the spacing between the mirror and the elevated address electrodes, an attractive force per unit area is 4× greater than the force generated between the mirror and the elevated electrodes is achieved. The design of the present invention achieves higher address torques, higher latching torques, higher reset forces, and greater address margins. The pixel is less susceptible to address upset, requires a lower reset voltage, and may eliminate the need for resonant reset and multiple reset pulses. Higher switching speeds are achieved, whereby non-linear and stiffer hinges can be implemented due to the improved performance parameters described. The pixel array can be fabricated with little deviation from the baseline process. Thus, the improved performance parameters achievable with the spatial light modulator of the present invention over previous generations is a "something for nothing" design over previous generations.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A spatial light modulator, comprising:

a) a substrate;

b) addressing circuitry comprising a first portion provided proximate said substrate and a second portion elevated above said substrate;

c) a yoke supported over said addressing circuitry first portion;

d) at least one hinge connected to said yoke and supporting said yoke, said hinge permitting deflection of said yoke; and e) a pixel elevated above and supported by said yoke, said pixel positioned over said elevated addressing circuitry second portion.

2. The spatial light modulator as specified in claim 1 comprising a pair of said hinges axially supporting said yoke along a yoke axis, wherein said addressing circuitry first portion is provided each side of said yoke axis.

3. The spatial light modulator as specified in claim 2 wherein said yoke has a pair of yoke tips on each side of said yoke axis.

4. The spatial light modulator as specified in claim 3 wherein said yoke has a butterfly shape.

5. The spatial light modulator as specified in claim 2 wherein a first pair of opposing surface areas are defined between said yoke and said addressing circuitry first portion, and a second pair of opposing surface areas are defined between said pixel and said addressing circuitry second portion, said second pair of opposing surface areas being laterally defined a greater distance from said yoke axis than is said first pair of opposing surface areas from said yoke axis.

6. The spatial light modulator as specified in claim 2 further comprising control circuitry coupled to said addressing circuitry, said control circuitry providing address data to one of said addressing circuitry first portions to cause deflection of said yoke toward said addressed first portion.

7. The spatial light modulator as specified in claim 1 wherein said yoke has a width less than the width of said pixel and said pixel overlaps said yoke.

8. The spatial light modulator as specified in claim 1 wherein a first spacing is defined between said yoke and said addressing circuitry first portion, and a second spacing is defined between said pixel and said addressing circuitry second portion, wherein said first spacing is smaller than said second spacing.

9. The spatial light modulator as specified in claim 1 wherein said yoke is in substantially the same plane as said addressing circuitry second portion.

10. The spatial light modulator as specified in claim 1 further comprising a bias/reset bus constructed on said substrate and electrically connected to said pixel.

11. The spatial light modulator as specified in claim 1 wherein said hinge is in substantially the same plane as said yoke.

12. The spatial light modulator as specified in claim 1 further comprising control circuitry coupled to said addressing circuitry, said control circuitry providing address data to said addressing circuitry first portion and said second portion to cause deflection of said pixel.

13. The spatial light modulator as specified in claim 1 further comprising a support post connected to and supporting said hinge.

14. The spatial light modulator as specified in claim 1 wherein said addressing circuitry first portion and said second portion are electronically connected to one another.

15. The spatial light modulator as specified in claim 1 wherein said pixel is a mirror.

16. The spatial light modulator as specified in claim 15 wherein said mirror has a rectangular shape.

17. The spatial light modulator as specified in claim 16 wherein said mirror has edges geometrically oriented at 45° with respect to said hinge.

18. A spatial light modulator, comprising:
a) a substrate;
b) addressing circuitry comprising a first portion provided proximate said substrate and a second portion residing above a plane defined by said first portion;
c) a yoke supported over said addressing circuitry first portion;
d) at least one hinge connected to said yoke and supporting said yoke, said hinge permitting deflection of said yoke; and
e) a pixel elevated above and supported by said yoke, said pixel positioned over said elevated addressing circuitry second portion.

* * * * *